July 11, 1939.  P. F. DONAHUE  2,165,622

PIPE CONNECTION

Filed May 20, 1938

INVENTOR
Patrick F. Donahue.
BY
H. F. Johnston
ATTORNEY

Patented July 11, 1939

2,165,622

UNITED STATES PATENT OFFICE 2,165,622

PIPE CONNECTION

Patrick F. Donahue, Waterville, Conn., assignor to Scovill Manufacturing Company, Waterbury, Conn., a corporation of Connecticut Application May 20, 1938, Serial No. 209,097

6 Claims. (Cl. 285—56)

This invention relates to pipe connections and particularly to attaching permanently and rigidly a threaded bushing to the end of a relatively thin wall tubular member. The invention is intended primarily for improving the construction of the so-called anti-siphon type of trap wherein there is provided a relatively large cylindrical chamber terminating at its upper end in a reduced neck portion to which is attached a threaded bushing for making connection with a lead-in pipe by means of the usual coupling nut.

It is the principal object of this invention to provide a means for attaching a threaded bushing, having sufficient strength and material to accommodate the standard thread, to the reduced neck portion of the trap without the use of solder, in a leak-proof manner and with sufficient gripping force to prevent relative turning of the connected members after once assembled.

A further object is to design the trap joint end and bushing in such a manner that the assembly may be effected by means of tools that may be operated on a punch press or similar machine; that is, to have the setting tools driven axially into the trap joint in making the assembly.

Other objects and advantages will be apparent from a consideration of the following description taken in connection with the accompanying drawing, in which.

Figure 1:
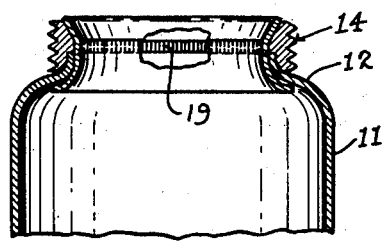
Fig. 1 is a vertical sectional view through one portion of the upper part of a main container of an anti-siphon trap illustrating the improved manner of attaching a threaded bushing thereto.

Referring now to the drawing wherein like numerals refer to like parts throughout the several views: numeral 10 refers generally to an anti-siphon trap, one portion of which consists of a relatively large cylindrical chamber 11, made from a drawn shell, the upper end of which is integrally formed into a more or less restricted or converging portion 12 terminating in a short upstanding neck 13, the latter having its walls parallel to the container axis. Since the chamber part 11 of the trap is made from a drawn shell, the stock thickness of the wall of the neck 13 is not sufficient to accommodate the standard thread employed for making such plumbing connections, thus necessitating the use of a bushing member 14 of sufficient stock thickness to take the standard coupling thread 15 for cooperation with a coupling nut (not shown) usually carried on the other pipe to which the union is made with the anti-siphon trap.

Figure 4:
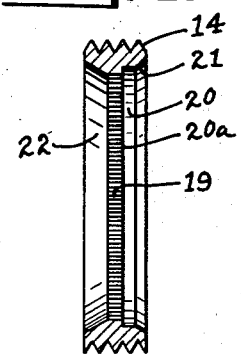
Fig. 4 is a vertical sectional view of the threaded bushing.

A means is provided for permanently attaching the bushing 14 to the chamber 11 in the form of a cylindrical sleeve 16, the lower part of which is formed into a flaring portion 17 and merges into an annular flange 18 disposed in a plane perpendicular to the axis of the sleeve 16. The interior diameter of the bushing member is constructed so as to provide at its intermediate portion a cylindrical surface 19 capable of having a snug fit around the cylindrical sleeve 16. As shown in Figs. 1 and 4 this surface 19 may be roughened preferably by a straight line knurl to assure a better gripping effect between the adjacent members. Immediately below the surface 19, the bushing 14 is formed with a stepped annular groove 20 and defining a shoulder 20a between the groove 20 and surface 19. The lower part of the groove connects with a small beveled section 21 by a relatively sharp angle joint, while the adjacent portion of the neck 13 merges into the converging portion 12 by a radius portion 12a for reasons which will be later explained. Immediately above the cylindrical wall 19, the bushing is formed with a larger beveled section 22, against which the adjacent walls of the sleeve 16 are formed as at 23 to conform with the bevel 22 and provide a suitable connecting joint face or seat to accommodate the complementary face of the connection member (not shown) in making the trap installation.

Figures 2, 3:
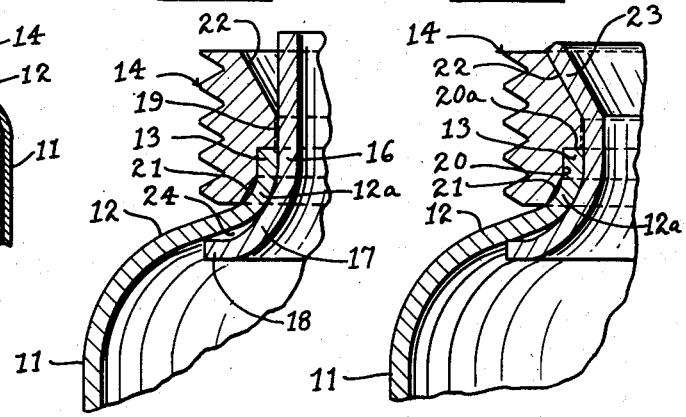
Fig. 2 is a vertical sectional view of only one section of the bushing connection drawn on an enlarged scale to more intimately show the details of construction as the parts appear before the setting operation.
Fig. 3 is a similar view showing the construction after the setting operation.

In the assembly of the device the bushing 14 is first fitted over the neck 13 of the chamber 11 with said neck engaging snugly within the stepped groove 20 for which the latter was purposely designed. The sleeve 16 is then inserted through the larger end of the chamber 11 to a position where the perpendicular flange 18 abuts against the inside wall of the converging portion 12 of the chamber 11, in a manner as shown in Fig. 2. By resting the converging portion 12 of the chamber 11 and flange 18 of the attaching sleeve 16 upon a suitable anvil disposed within the chamber 11, another tool of suitable shape may be axially forced into the sleeve from the upper end thereof for the purpose of flaring the wall of such sleeve outwardly against the larger beveled section 22 and swell the intermediate part of the sleeve 16 into the knurled surface 19 to interlock the parts together, and incidentally provide for the connecting joint seat 23, previously mentioned.

It will be noted, by inspecting Figs. 2 and 3, that the connection radius 12a of the converging portion 12 of the chamber 11 is different from the radius or particular form of the flared portion 17 of the sleeve 16 so that when the attaching sleeve 16 is assembled in place the result will be a slight opening or clearance 24 between the adjacent walls of sleeve 16 and radius section 12a. The object of this clearance 24 is to assure, in the assembly operation, that the upper edge of the flange 18 will bite or be forced into the metal material of the converging portion 12. At the same time the relatively sharp angular corners where the small beveled section joins the adjacent walls of the bushing 14 will likewise be forced tightly into the metal of the radius portion 12a and thus assuring a leak-proof and a lock-proof connection between the parts on opposite sides of the wall at the upper end of the chamber 11. This biting effect is caused by the manner of assembly wherein the flange 18 rests upon the suitable anvil and the tool employed for beveling the seat 23 being forced axially into the chamber will necessarily jam all the parts tightly together and at the same time force the wall of the connecting sleeve 16 outwardly to grip into the knurled section 19.

As a practical example, the tools that may be employed for accomplishing the assembly of the parts will be given in connection with the description and drawing of the modified form hereinafter disclosed.

Figure 5:
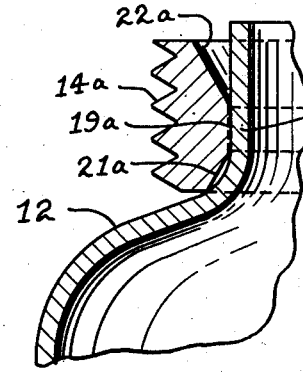
Fig. 5 is a fragmentary vertical sectional view of a modified form of construction and somewhat simplified over the first form, the view showing the parts before assembly.
Figure 6:
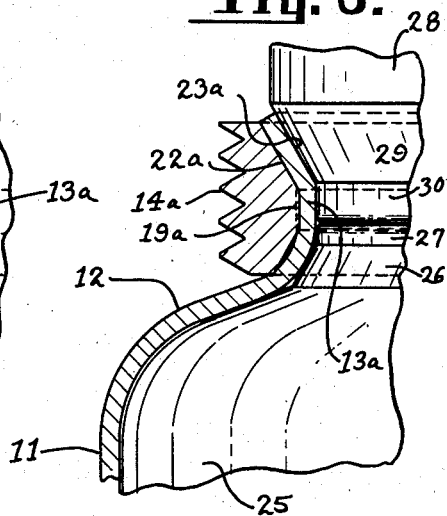
Fig. 6 is a similar view as the parts appear after the setting operation, and showing the tools for performing the setting operation.
Figure 8:
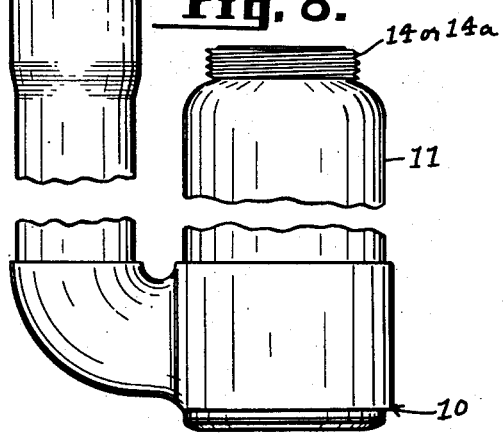
Fig. 8 is a side elevation, in abbreviated form, of an anti-siphon trap embodying the principle of this invention.
Figure 7:
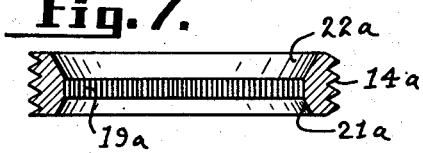
Fig. 7 is a vertical sectional view of the bushing used in the modified form of construction.

The modified form of construction illustrated in Figs. 5, 6, and 7 differs from the first form in that the connecting sleeve 16 is eliminated and in place thereof the cylindrical neck 13a of the chamber 11 is extended considerably in length, and the upper end thereof is flared outwardly against the larger bevel face 22a of the bushing 14a to produce the connecting joint seat 23a. In this construction the annular groove 20 is omitted from the bushing 14a whereby the intermediate surface 19a is increased in width and, if desired, provided with the straight line knurl as in the first form. The smaller beveled face 21a of the bushing 14a connects into the adjacent base surface of the bushing and the surface 19a by a relatively sharp angle joint for the purpose of biting into the metal surface of the connecting radius section 12b when the bushing 14a is assembled in place.

The purpose of having the connecting angle joint on the opposite sides of the small bevel 21 or 21a bite into the adjacent surface of the radius section 12a or 12b in both forms of the construction is to make the joint leak-proof at that portion so as to prevent solution or acids seeping in between the metal surfaces when such matter might lodge in any interstices therebetween and subsequently leak out to weaken the connection and ruin the finish of the article.

The tools by which the bushing may be secured to the neck of the chamber 11 are shown in Fig. 6. Herein an anvil 25 is employed having its upper end shaped in conformity with the converging portion 12 of the chamber 11. The anvil 25 is surmounted with a frustum-conic neck section 26 terminating in a relatively short cylindrical tip 27 that snugly fits the interior diameter of the neck 13a. The anvil is preferably a stationary member and the chamber 11 with the bushing in the state as shown in Fig. 5 is slipped over the top of the anvil 25 with the converging portion 12 resting on the correspondingly shaped portion of the anvil and the interior high point of the radius section 12b engaging the conic section 26.

The punch 28 for upsetting the metal stock of the neck 13a travels in an axial line common with the axis of the chamber 11. The punch 28 is formed with a conic working face 29 terminating in a reduced cylindrical bead 30. The diameter of the latter is preferably .010" or .012" larger than the interior diameter of the neck 13a. The punch 28, as it is driven forceably into the end of the neck 13a, will cause the latter to be flared outwardly and be tightly seated against the larger bend 22a of the bushing 14a and the head 30 of the punch, because of its increased diameter of the interior of the neck 13a, will cause the intermediate portion of the neck to be expanded and forced into the interstices of the knurled surface 19a.

While the form of the invention shown and described herewith embraces a preferred embodiment of the same, as applied to a trap connection, this is merely by way of illustration and the invention is not limited entirely to such devices but may be adapted for other uses and it is to be understood that the construction may be varied as to mechanical details without departing from the spirit of the invention and the scope of what is claimed.

What is claimed is:

1. A connection for a cylindrical chamber having a converging portion terminating in a tubular neck comprising an exterior threaded bushing having an interior stepped groove and a beveled face, the stepped groove designed to accommodate said neck, and a tubular sleeve having a flanged portion integral with its inner end for engaging the interior of said portion and having its opposite end flared outwardly against said beveled face to hold the parts in permanent assembled position.

2. A connection for a cylindrical chamber made of a relatively thin wall shell having a converging portion terminating in a tubular neck, the connection comprising an exterior threaded bushing and an attaching sleeve, said sleeve having a flanged portion integral with its inner end for engaging the interior of said portion, said bushing in its interior formed with an intermediate cylindrical surface, a beveled face immediately thereabove and a stepped grooved recess immediately below, the cylindrical surface designed to tightly embrace the adjacent wall of said sleeve and the recess to receive the neck of said shell, the outer end of said sleeve being flared outwardly in engagement with the beveled face of said bushing.

3. A connection for a cylindrical chamber having a converging end merging into a relatively short tubular neck by a connecting radius portion, the connection comprising an exterior threaded bushing and an attaching sleeve, said sleeve having one end arcuately flared and terminating in an annular flange perpendicular to the axis of the sleeve, the interior of said bushing being formed with an intermediate cylindrical surface, a beveled surface immediately thereabove and a recess portion therebelow, the latter designed to receive the neck and radius portion of the converging end, the opposite end of said sleeve being flared outwardly against said bevel to hold the parts in permanent assembled position.

4. A connection for a cylindrical chamber having a converging end merging into a relatively short tubular neck by a connecting radius portion, the connection comprising an exterior threaded bushing member and an attaching sleeve, said sleeve having one end arcuately flared and terminating in an annular flange substantially perpendicular to the axis of the sleeve, the interior of said bushing being formed with an intermediate cylindrical surface with a beveled surface immediately thereabove and a recess portion therebelow, the latter designed to receive the neck and radius portion of the converging end, the opposite end of said sleeve flared downwardly against said bevel to hold the parts in permanent assembled position, the radius portion and flared end of the sleeve differing in shape to the extent of leaving a slight clearance between their adjacent walls whereby the upper edge of the perpendicular flange will be assured a better bite into the adjacent wall of converging end upon assembly.

5. A connection for a cylindrical chamber having a converging portion terminating in a tubular neck, the connection comprising a threaded bushing and an attaching sleeve, said sleeve having one end arcuately flared, terminating in an annular flange perpendicular to the axis of the sleeve and presenting an upper sharp circular edge, the interior of said bushing formed with a cylindrical knurled surface and a beveled face at its inner end connected to the adjacent surface of said bushing by relatively sharp angular corners, the end of the tubular neck flanged over the end of said bushing and the adjacent portion expanded radially against said knurled surface as a means of permanent assembly, said flanging and expansion of the neck effected by tools operating in an axial direction so as to cause the assembled parts to be jammed together in such a manner as to have the corners of the bushing embedded into the outer surface of said neck and the upper sharp corner of said flange likewise embedded into the inner surface of said converging portion and thereby effect a leak-proof seal between the connected parts.

6. A trap connection comprising a tubular member having an intermediate shoulder and terminating in a neck portion, a threaded ring bushing adapted to seat upon said shoulder and having an upper bevelled face, the upper end of said neck portion being flared outwardly over said bevelled face as a means of permanent assembly, and the lower inner wall surface of said bushing having a surface contour different from the adjacent supporting surface of said shoulder and merging neck portion, which different surface contour is designed to be embedded into the adjacent surface of said shoulder and neck to effect a liquid proof seal therebetween coincident with the assembly of the bushing to the tubular member.

PATRICK F. DONAHUE.